(12) United States Patent
Jahns

(10) Patent No.: US 6,223,888 B1
(45) Date of Patent: May 1, 2001

(54) ACCUMULATION CONVEYOR

(75) Inventor: Werner Jahns, Seligenstadt (DE)

(73) Assignee: Mannesmann A.G., Dusseldorf (DE)

( * ) Notice: Subject to any disclaimer, the term of this patent is extended or adjusted under 35 U.S.C. 154(b) by 0 days.

(21) Appl. No.: 09/314,411

(22) Filed: May 19, 1999

(30) Foreign Application Priority Data

| May 28, 1998 | (DE) | 198 25 387 |
| Jul. 2, 1998 | (DE) | 198 31 220 |

(51) Int. Cl.$^7$ .................................................. B65G 13/07
(52) U.S. Cl. ............................ 198/781.03; 198/781.09; 198/790
(58) Field of Search ............... 198/781.03, 781.09, 198/790

(56) References Cited

U.S. PATENT DOCUMENTS

| 2,493,479 | 1/1950 | Eggleston | 198/127 |
| 3,420,356 | 1/1969 | De Good | 198/127 |
| 4,109,783 | 8/1978 | Vogt | 198/781 |
| 4,273,239 | 6/1981 | Thwaites et al. | 198/781 |
| 4,297,121 | * 10/1981 | Rhonehouse | 198/790 X |
| 4,570,780 | 2/1986 | Thwaites et al. | 198/781 |
| 4,721,203 | 1/1988 | Kimball et al. | 198/781 |

FOREIGN PATENT DOCUMENTS

| 567808 | 12/1932 | (DE) . |
| 2650205 | 5/1978 | (DE) . |
| 3711697 | 2/1988 | (DE) . |
| 29622845 | 8/1997 | (DE) . |
| 377884A1 | 7/1990 | (EP) . |
| 543336A1 | 5/1993 | (EP) . |
| 2162433 | 7/1973 | (FR) . |
| 2537103 | * 6/1984 | (FR) | 198/790 |

* cited by examiner

*Primary Examiner*—Steven A. Bratlie
(74) *Attorney, Agent, or Firm*—Van Dyke, Gardner, Linn & Burkhart, LLP

(57) ABSTRACT

The invention refers to a roller conveyor for individually packed goods units, and particularly for heavy, individually packed goods units such as pallets, with multiple successive and spaced rollers arranged in the direction of conveyance, provided also with carrier rollers that form a conveying surface for the packed goods units, and having at least one continuous drive belt proceeding in the conveying direction as well as along the side of the carrier rollers that face the conveying surface, and that same belt—in order to drive the carrier rollers—can be placed (pressed) against the carrier rollers via hugger rollers that can be moved in the carrier rollers' conveyance direction, by means of shifting (regulating) devices.

In order to create a roller conveyor for individually packed goods units such as pallets, which offers an optimized drive performance, it is proposed that each driven carrier roller (2) be provided with a hugger roller (11) which is arranged on the side of the respective carrier roller (2) that faces the conveying surface (5).

23 Claims, 3 Drawing Sheets

ACCUMULATION CONVEYOR

TECHNICAL FIELD AND BACKGROUND OF THE INVENTION

The invention refers to a roller conveyor for heavy, individually packed goods units such as heavy individually packed hoods units, such as pallets A retarding roller conveyor is already known from the European patent specifications EP 0 543 336 A1, whose carrier rollers can be stopped or, respectively, activated by sections in order to convey individually packed goods units without dynamic pressure. The goods units are moved in the conveying direction by a continuous flat belt whose upper strand—in order to transfer the drive forces—can be lifted up towards the carrier rollers by means of hugger rollers. Each hugger roller rests on the end of a double lever that can be rotated around a horizontally oriented axis that is arranged at right angles to the conveying direction. Viewed in the conveying direction, the hugger rollers are arranged in every second space present between the consecutive and spaced carrier rollers. The hugger's upward (lift) movement lifts the flat belt against the carrier roller. The transfer of the drive forces is effected by swinging the double lever horizontally via a pneumatic cylinder that engages it. This lifts the hugger rollers to the extent that the flat belt is slightly and unilaterally wrapped around the carrier rollers. The pneumatic cylinders of each hugger roller section are interconnected via a controlling device, so that all hugger rollers in the same section can be lifted or lowered jointly.

Carrier rollers are braked by braking elements, arranged in pairs at the end of the double lever facing the hugger roller, mounted in such a way that the two carrier rollers next to the double lever can be braked jointly. For this purpose, the braking elements are pressed upwards against the carrier rollers. Since the hugger roller and the two braking elements are arranged at the opposing ends of the shared double lever, the carrier rollers 25 depending on the swing position of the double lever—are either activated or braked.

This type of sectional drive operation for accumulator roller conveyors may cause problems when very heavy goods units are to be conveyed within a short period of time, or when additionally and at the same time several sections of the retarding roller conveyor are to be activated during a so-called block retraction. This may cause the drive belt to stretch and to slip between the flat belt and the carrier rollers and may reduce the wrap-around angle between the carrier roller and the flat belt, all of which may retard the speed-up and, thus, lead to a non-repeatable/reproduceable speed-up behavior of the retarding roller conveyor. In order to prevent possible goods units collisions that this may cause, safeguards in the form of lengthened retarding site sections have to be provided. This will also prevent the drive belt to suffer higher wear if it should slip.

A similarly executed retarding roller conveyor is known from the U.S. Pat. No. 3,420,356. Here as well, the carrier rollers are impelled via a driven flat belt that can be lifted towards them. The lifting of the flat belt is effected via the hugger rollers that are arranged below the respective carrier rollers. The hugger rollers themselves are permanently fixed and, therefore, not adjustable vertically, and their periphery is provided with a flattened area. When this flattened area faces the carrier rollers, the flat belt slides over it, but without activating the carrier rollers. By turning the hugger rollers' non-flattened part towards the carrier roller, the flat belt is lifted so as to come into contact with the lower part of the carrier roller and thus activating it. Due to the hugger roller's special peripheral shape, the carrier rollers—depending on the direction in which the hugger roller turns—are alternately impelled or not. If now, during the retarding stage, some part of the conveyed goods is stopped on the carrier rollers from the outside; then, in order to prevent any further drive force transfers from the flat belt to the carrier roller, a specially designed hugger roller is being provided that has a laterally arranged, additional drive pulley; the pulley's diameter is selected in such a way that it will assure constant contact with the carrier roller. When retarding of a part of the conveyed goods occurs, the pulley curbs both the carrier roller's and the hugger roller's rotational movement somewhat, while keeping the drive rollers rotating sufficiently to detach the flat belt form the lower surface of the carrier; however, the pulley inhibits any rotation that would lift the flat belt up to the lower surface of the carrier roller, as long as the part of the goods being conveyed that rests on the carrier roller is impending the bugger roller's rotation.

SUMMARY OF THE INVENTION

This retarding roller conveyor has a hugger roller under each carrier roller, but each of these has a specially designed flattened area that provides the desired intermittent drive mode for the retarding roller conveyor. The hugger rollers are not being moved vertically to lift the flat belt.

A retarding roller conveyor is also described in the German Patent Specifications DE 26 50 205 C2, in which each of its carrier rollers is provided with a drive roller that can be adjusted to directly transfer the drive forces to the lower surface of the carrier roller. The drive rollers have two circumferential toothed gears. A continuous drive chain engages the first toothed gear and drives the impelling rollers. The drive roller's second toothed gear can be engaged by activating the drive rollers with the supplementary toothed gear/ring that is arranged on the carrier roller. The horizontal swing movement of the drive rollers—used to engage or, respectively, disengage the drive roller's teeth and the carrier roller's teeth—is effected via rods that link the drive rollers to each other at a retarding site.

This carrier roller drive mode has its disadvantages, since in order to establish the drive connection, the horizontally swung drive rollers engage the teeth of the carrier rollers very abruptly and, thus, expose the packed goods units to high acceleration.

Consequently, this type of drive is not suitable for delicate goods. Furthermore, due to their abrupt engagement when making the drive connection, the gear teeth will suffer greater wear.

Also known from the U.S. Patent Specification U.S. Pat. No. 4,109,783 is another retarding roller conveyor where the carrier rollers can be impelled via hugger rollers which can be pressed friction-tight against them from below. Here each drive roller is placed in a swing arm (rocker), that can be swiveled around a horizontally oriented axis, positioned at right angles to the conveying direction, and can be lifted upwards towards the carrier rollers by means of a pneumatic cylinder in order to establish the contact between the driving roller and the two consecutive carrier rollers. Here as well, the drive rollers are driven via a continuous chain and toothed gear.

This type of drive for carrier and retarding rollers may have the drawback that, on the one hand, not every carrier roller is being driven and, on the other, that due to the drive roller being pressed against and swingably arranged on the swing arm (rocker), the press-on (hugging) forces the two of the subsequent drive rollers in the conveying direction depend to a high degree on being able to maintain the subsequent carrier rollers' spacing that was established during installation.

It is the task of the present invention to create (provide for) a roller conveyor for individually packed goods units, and especially for heavy goods units such as pallets, that offers an optimized drive performance.

This problem is solved with a roller conveyor provided with brakable carrier rollers for the conveyed goods units and particular for heavy individually packed goods units such as pallets, with multiple successive and spaced rollers arranged in the direction of conveyance and forming a conveying surface for the packed goods units, with at least one continuous drive belt proceeding in the conveying direction as well as along the side of the carrier rollers facing the conveying surface. In order to drive the carrier rollers, a belt is pressed against the carrier rollers via hugger rollers, which can be adjusted in the carrier rollers' conveyance direction by means of shifting devices, with each driven carrier roller being provided with a hugger roller, which is arranged at that side of the carrier roller that faces the conveying surface. Advantageous executions of the invention include each hugger roller being provided with its own shifting device for the shifting movement of the hugger rollers. Such shifting devices include, for example, pneumatic pistons/cylinder units. Other advantages include the axis of the hugger rollers being essentially aligned on a vertical plane with the axis of the rotation of the allocated carrier roller when the conveying surface is horizontally aligned. Additional advantages include the hugger rollers resting upon one end of a lever and with the other end of the lever including a swing axis, which is aligned horizontally as well as in the conveying direction and is supported by a U-shaped holding element that rests on a longitudinal support member of the roller conveyor.

As per the invention, a hugger roller is being arranged on the allocated carrier roller to press it upwards against the continuous drive belt, thus achieving the optimization of the drive belt's "hugging" pressure on the carrier roller's surface. This makes possible a rapid and noiseless starting movement of the carrier rollers. Furthermore, this mode of pressing the drive belt directly against the carrier roller's surface achieves that in the presence of known friction coefficients between the carrier roller's surface, the drive belt and the hugger roller, the frictional engagement becomes directly dependent upon the press-on force of the hugger roller and, consequently, will reliably impel even heavy goods units, such as loaded pallets weighing between approximately 300 and 2000 kg. The non-loaded pallet weight is approx. 30 kg. In order to achieve an optimal adjustment/setting of the hugger roller's press-on force, each hugger roller is provided with its own means of adjustment. This makes it very easy to compensate for the design tolerances that have a bearing on the "hugging" pressure. Tolerance adjustments can be compensated for by wear, since it is not the adjusting path that defines the press-on pressure but the working (operation) pressure.

An advantageous execution provides that when the conveyor surface is horizontally aligned, the axes of the hugger rollers are essentially aligned on a vertical plane with the axis of rotation of the allocated carrier roller. Favorable results were obtained by designing the adjusting means in the form of a pneumatic piston/cylinder unit that moves the hugger rollers towards the carrier rollers. The hugger rollers being arranged at one end of the lever that can be swung around a horizontally aligned axis of rotation that is at right angles to the conveying direction has the advantage that this allows to guide the hugger rollers in a mechanically simple manner during their start-up (initial) movement; the lever's axis of rotation is supported by a U-shaped holding element which in turn is supported by the roller conveyor's supporting frame.

It is also advantageous to design the drive belt as a toothed belt since on the one hand this prevents the continuous toothed belt from slipping between the drive and reversing pulleys and, on the other hand, because of its greater stiffness vs. that of a standard flat belt, the toothed belt tends less to stretch lengthwise. This assures additionally that a repeatable/reproducible acceleration of goods units conveyance is feasible. It has been found that designing the drive belt as a toothed belt has the added advantage that the belt's toothed surface can be provided with a conveying-direction-oriented fixed spacer that projects above the teeth, since thus the toothed belt is easily guided and pressed by the hugger rollers. For this purpose the hugger rollers are provided with a continuous and complementary groove. Furthermore, the hugger roller's surface is fashioned in such a way that a space/gap remains between the drive belt's teeth and the surface of the hugger roller; this prevents any noise generation that might be caused when the teeth pass over the cylindrical or spherical surface of the hugger roller.

Below follows a more detailed description of the execution example that is shown in the drawing. In same, the roller conveyor is executed in the form of a retarding roller conveyor.

BRIEF DESCRIPTION OF THE DRAWINGS

FIG. 1 shows a section of a conveyor constructed as a retarding conveyor 1 with driven carrier rollers 2. Essentially, the roller conveyor 1 consists of two parallel-running, longitudinal support members 3, interconnected via cross members 4, and with the carrier rollers 2 lying between them. The carrier rollers 2 form a level conveying surface 5 for the packed goods units 6, and their rotating axes D produced at right angles to the conveying direction F as well as horizontally.

Figure 1:
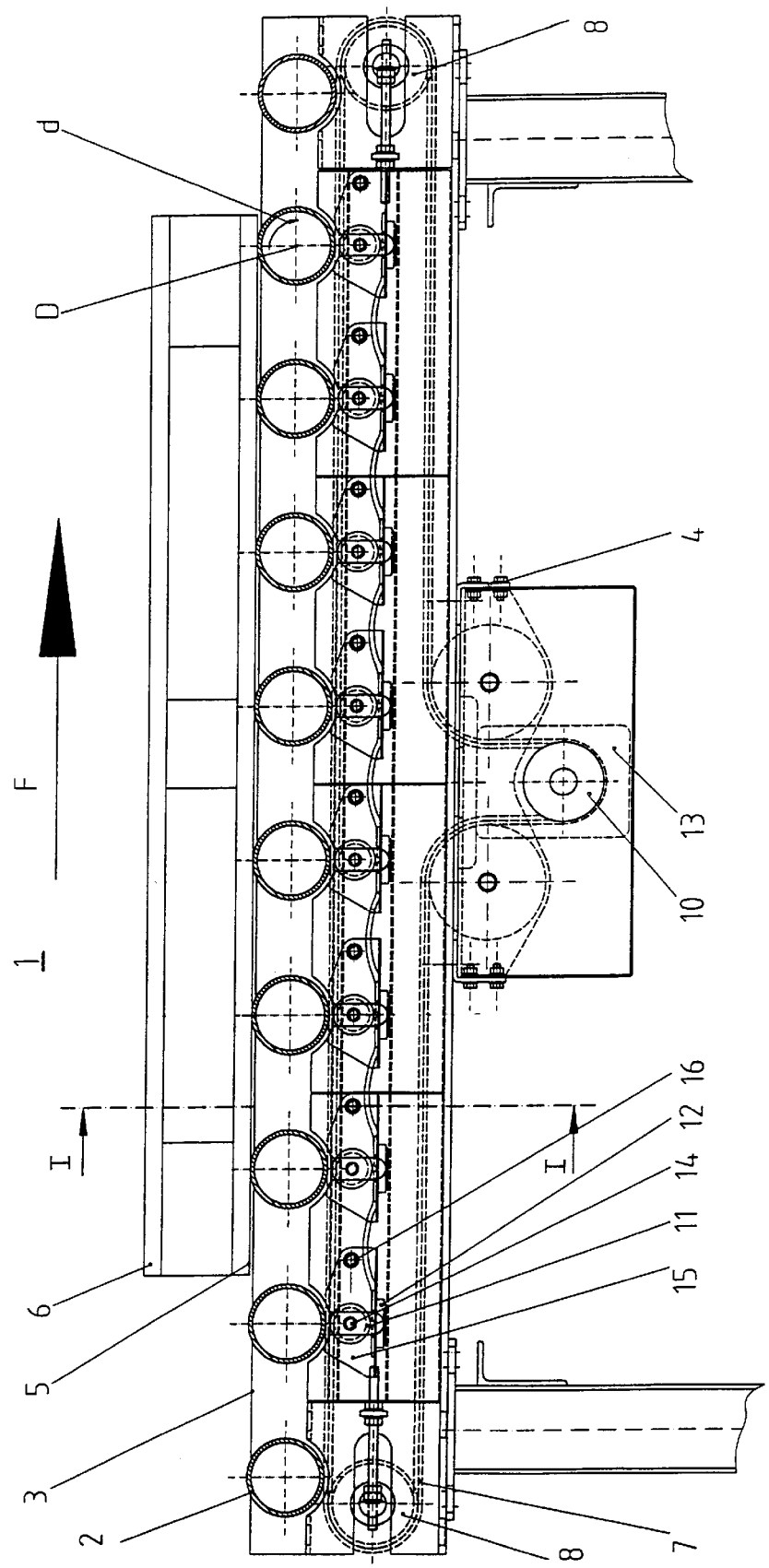
FIG. 1 a view of a retarding roller conveyor while its carrier rollers are being impelled.

Each carrier roller 2 can be activated in the rotation direction d through friction contact via a tooth belt 7. For this purpose, the drive belt 7 is guided around two reversing pulleys 8 which can be adjusted to tension the drive belt that is guided around a continuous drive pulley 10, and where the belt's upper strand can be pressed upwards against the carrier rollers 2. The reversing pulleys 8 rest on the longitudinal members 3 at the respective ends of the section of the conveyor 1. Viewed vertically, the drive pulley 10, which can be driven by an electric motor 13, is arranged below the roller conveyor 1. The drive pulley 10 and the electric motor are attached to the cross member 4. The friction contact between the drive belt 7 and the carrier rollers 2 is established by lifting the upper strand of the drive belt 7 towards the carrier rollers 2 with the hugger rollers 11. Each carrier roller 2 has been provided with a hugger roller 1, which-in the case of a horizontally aligned conveying surface 5—is arranged below the respective carrier roller 2 and, in its raised state, presses the drive belt 7 against the lower surface of the carrier roller 2. In case of a horizontally aligned conveying surface 5, it is preferable that the rotating axes D of the carrier rollers 2 and the axes 4 of the allocated hugger rollers 11 lie on a vertical plane.

The lifting and lowering movements of the hugger rollers 11, required to transfer or, respectively interrupt the drive forces, are effected via the respective individual pneumatic piston/cylinder unit 12.

Figure 2:
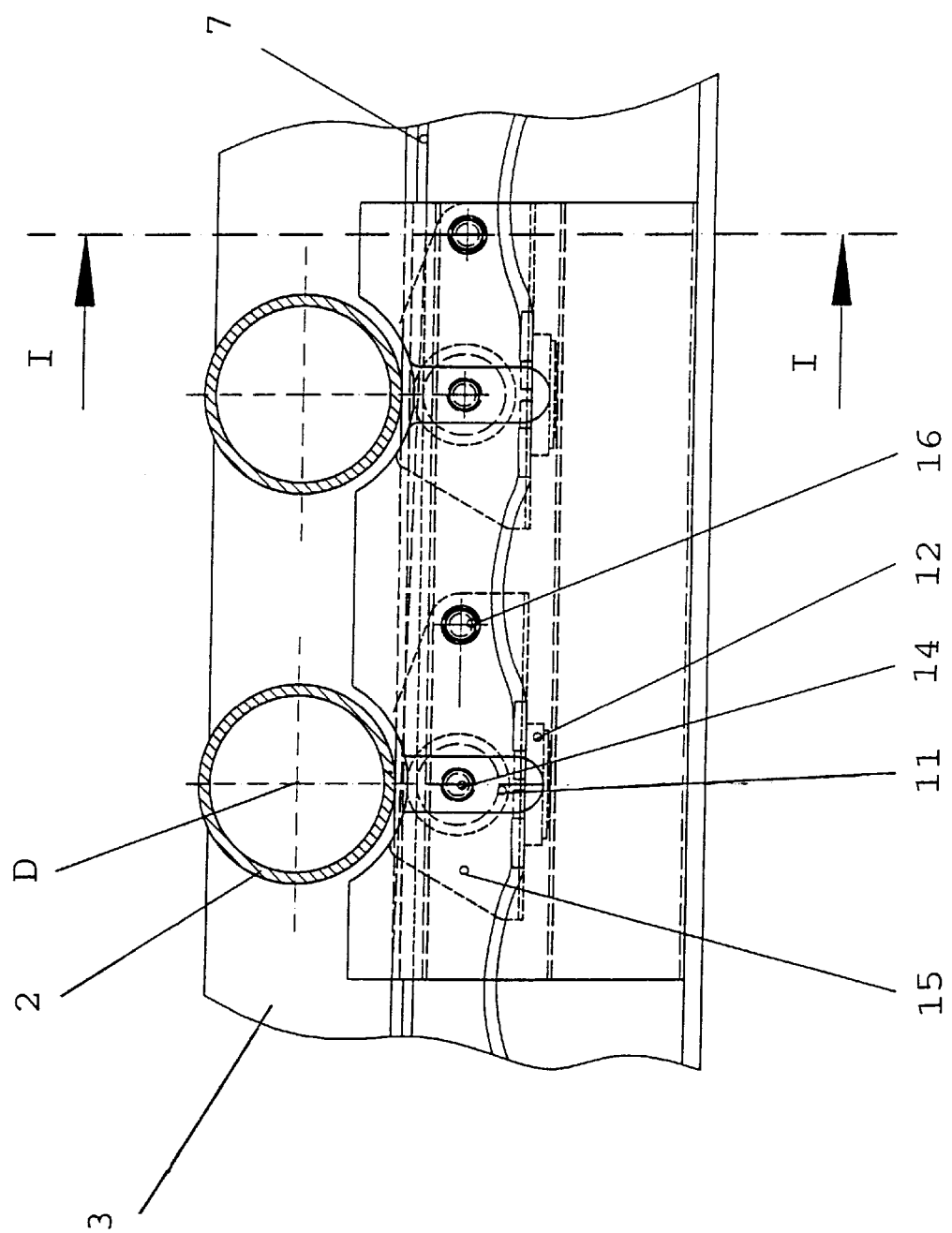
FIG. 2 an enlarged section of FIG. 1 from the area of a hugger roller.

The arrangement of the hugger roller 11 and its interaction with the piston/cylinder unit 12 is illustrated in FIG. 2, which shows an enlarged section of the hugger roller 11 area as per FIG. 1. It is discernible that in each case the hugger rollers 11—with their axes 14 aligned horizontally and at right angles to the conveying direction as well as parallel to the axes of rotation D of the Carrier rollers 2—rest upon a lever 15. The lever is positioned unilaterally around a swivel axis 16 on the longitudinal member 3. Thus, the hugger roller 11 is guided in a mechanically simple manner during the lifting and lowering movement. Seen in the direction of the axis 14, the lever 15 shows a triangular cross-cut; the axis 16 and axis 14 are positioned in the first and second corner, and the pneumatic piston/cylinder unit 12, that rests on the longitudinal support member 3 engages in the area of the third corner.

Figure 3:
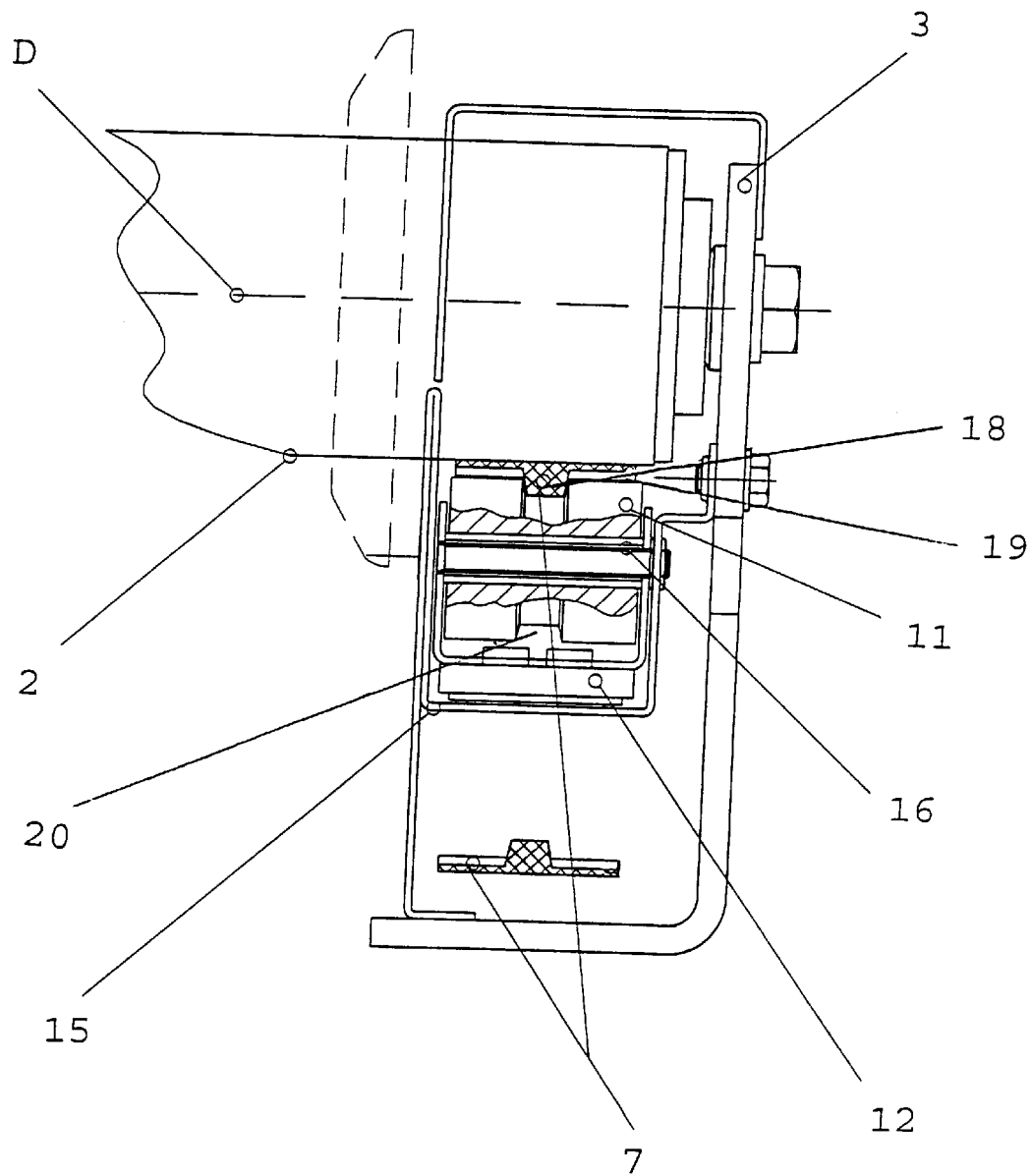
FIG. 3 an enlarged partial crosscut of FIG. 1 along the crosscut line 1—1.

FIG. 3—an enlargement of a partial crosscut of view along the line 1—1—also shows that the drive belt 7 proceeds between the hugger roller 11 and its allocated carrier roller 2 and that, essentially, the top of pneumatic piston/cylinder unit 12 is fashioned much flatter than is usual. Furthermore, it shows the special structure of the drive belt 7 that is fashioned as a toothed belt with teeth 19 and which is provided with a spacer 18, that proceeds in the conveying direction. The spacer 18 protrudes above the teeth 19 and is positioned/guided in a complementary groove 20, provided in the peripheral area of the carrier hugger 11.

FIG. 1 shows only a section of a roller conveyor 1 that is designed for retarding-pressure-free stopping of the packed goods units 6. Normally, the roller conveyor 1 consists of multiple, successively but separately arranged sections that can be driven and stopped, and whose length is adapted to the size of the goods units to be conveyed. The hugger rollers 11 can be lifted or lowered jointly by section via pneumatic piston/cylinder units 12 that are interlinked by means of control devices.

Brake elements (not shown), as well as pneumatic piston/cylinder units can be provided at the respective carrier rollers 2 in order to brake them and, consequently, the goods units as well; braking is effected by pressing the brake elements and/or the pneumatic piston/cylinder unit upwards, directly against the surface of the carrier roller 2. It is also

What is claimed:

1. A roller conveyor for individually packed units, in particular for heavy individually packed goods units such as pallets, said roller conveyor comprising:
   multiple successive and spaced carrier rollers arranged in a direction of conveyance and forming a conveying surface for the packed goods units; and
   at least one continuous drive belt proceeding in said conveying direction as well as along the side of said carrier rollers facing the conveying surface, said drive belt being against said carrier rollers via hugger rollers by means of shifting devices, each of said carrier rollers being provided with one of said hugger rollers, which is arranged at that side of the carrier roller that faces the conveying surface, and each hugger roller being provided with its own shifting device whereby each hugger roller can be moved independently of the other hugger rollers.

2. A roller conveyor as per claim 1, wherein each shifting device includes a lever, said hugger rollers supported on said levers.

3. A roller conveyor as per claim 2, wherein each shifting device further includes a pneumatic piston/cylinder unit.

4. A roller conveyor as per claim 1, wherein in the presence of a horizontally aligned conveying surface the axis of the hugger rollers lie essentially on a vertical plane with the axis of rotation of the allocated carrier roller.

5. A roller conveyor as per claim 2, wherein in the presence of a horizontally aligned conveying surface the axis of the hugger rollers lie essentially on a vertical plane with the axis of rotation of the allocated carrier roller.

6. A roller conveyor as per claim 3, wherein in the presence of a horizontally aligned conveying surface the axis of the hugger rollers lie essentially on a vertical plane with the axis of rotation of the allocated carrier roller.

7. A roller conveyor as per claim 1, wherein each of said hugger rollers rests upon one end of a lever, and another end of said lever including a swing axis, which is aligned horizontally as well as in the conveying direction, said lever being supported by a U-shaped holding element that rests on a longitudinal support/member of the roller conveyor.

8. A roller conveyor as per claim 2, wherein said hugger rollers rest upon one end of a lever, and another end of said lever including a swing axis, which is aligned horizontally as well as in the conveying direction, said lever being supported by a U-shaped holding element that rests on a longitudinal support/member of the roller conveyor.

9. A roller conveyor as per claim 4, wherein each of said hugger rollers rests upon one end of a lever and another end of said lever including a swing axis which is aligned horizontally as well as in the conveying direction said lever being supported by a U-shaped holding element that rests on a longitudinal support/member of the roller conveyor.

10. A roller conveyor as per claim 2, wherein said drive belt comprises a toothed belt.

11. A roller conveyor as per claim 4, wherein said drive belt comprises a toothed belt.

12. A roller conveyor as per claim 7, wherein said drive belt comprises a toothed belt.

13. A roller conveyor for individually packed units, in particular for heavy individually packed goods units such as pallets, said roller conveyor comprising:
   multiple successive and spaced carrier rollers arranged in a direction of conveyance and forming a conveying surface for the packed goods units;
   at least one continuous drive belt proceeding in said conveying direction as well as along the side of said carrier rollers facing the conveying surface, said drive belt being pressed against said carrier rollers via hugger rollers by means of shifting devices, said drive belt comprising a toothed belt having a toothed surface, said drive belt having a spacer proceeding in the conveying direction (F) that protrudes above the teeth of said toothed belt and is solely supported and guided by a groove on each of said hugger rollers, said drive belt being arranged to loop around said hugger rollers, while leaving a gap between the teeth of said toothed belt and the surface of the hugger rollers.

14. A roller conveyor according to claim 13, wherein each hugger roller is provided with its own shifting device.

15. A roller conveyor according to claim 14, wherein each of said shifting devices comprises a pneumatic piston/cylinder unit.

16. A roller conveyor according to claim 13, wherein each of said carrier rollers has an axis of rotation, said hugger rollers generally lying in a vertical plane aligned with the respective axes of rotation of said carrier rollers.

17. A roller conveyor according to claim 15, wherein each of said shifting devices includes a corresponding lever, each of said hugger rollers resting upon a first end of said corresponding lever, each of said levers having a swing axis, and said pneumatic piston/cylinder units lifting said first ends of said levers to thereby lift said hugger rollers.

18. A roller conveyor for individually packed units, and particularly for heavy individually packed goods units such as pallets, said roller conveyor comprising:

a plurality of spaced carrier rollers arranged in a direction of conveyance and forming a conveying surface on one side of said rollers for the packed goods units;

at least one continuous drive belt extending in said conveying direction;

a corresponding plurality of hugger rollers, said drive belt being pressed against an opposed side of said carrier rollers by said hugger rollers; and a corresponding plurality of shifting devices, each of said shifting devices including a lever and a lifting device, said levers supporting said hugger rollers, and said lifting devices lifting said levers to thereby lift said hugger rollers to press a portion of said drive belt associated with said hugger rollers against a corresponding carrier roller to thereby drive said corresponding carrier roller whereby each of said hugger rollers can be lifted independently of the other hugger rollers.

19. A roller conveyor according to claim 18, wherein said lifting devices comprises pneumatic piston/cylinder units.

20. A roller conveyor according to claim 18, wherein each of said carrier rollers has an axis of rotation, each of said hugger rollers generally lying in a vertical plane aligned with said axis of rotation of a corresponding carrier roller.

21. A roller conveyor according to claim 18, wherein said drive belt comprises a tooth drive belt having a plurality of teeth.

22. A roller conveyor according to claim 21, wherein said tooth drive belt includes a toothed surface and a spacer, said spacer extending in said conveying direction and projecting beyond said teeth, and said spacer supporting said drive belt in said hugger rollers.

23. A roller conveyor according to claim 22, wherein each of said hugger rollers include an outer surface, said teeth being spaced from said outer surfaces of said hugger rollers to thereby reduce noise generation.

\* \* \* \* \*

UNITED STATES PATENT AND TRADEMARK OFFICE
CERTIFICATE OF CORRECTION

PATENT NO. : 6,223,888 B1
DATED : May 1, 2001
INVENTOR(S) : Werner Jahns

It is certified that error appears in the above-identified patent and that said Letters Patent is hereby corrected as shown below:

Column 1,
Line 8, "hoods" should be -- goods --
Line 8, insert -- . -- after "pallets"
Line 38, "25" should be -- — --

Column 2,
Line 19, "bugger" should be -- hugger --

Column 4,
Line 63, "hugger roller 1" should be -- hugger roller 11 --

Column 5,
Line 20, insert -- of rotation -- after "axis" in the first occurrence
Line 34, delete "hugger 11" and insert -- roller 2 --
Line 49, insert -- feasible to provide a fixed braking belt parallel to the drive belt 7, that can also be pressed directly against the surface of the carrier via the hugger rollers 11. -- after "It is also"

Column 6,
Line 31, insert -- , -- after "lever"
Line 32, insert -- , -- after "axis"
Line 33, insert -- , -- after "direction"

Signed and Sealed this

Eighth Day of February, 2005

JON W. DUDAS
*Director of the United States Patent and Trademark Office*